UNITED STATES PATENT OFFICE.

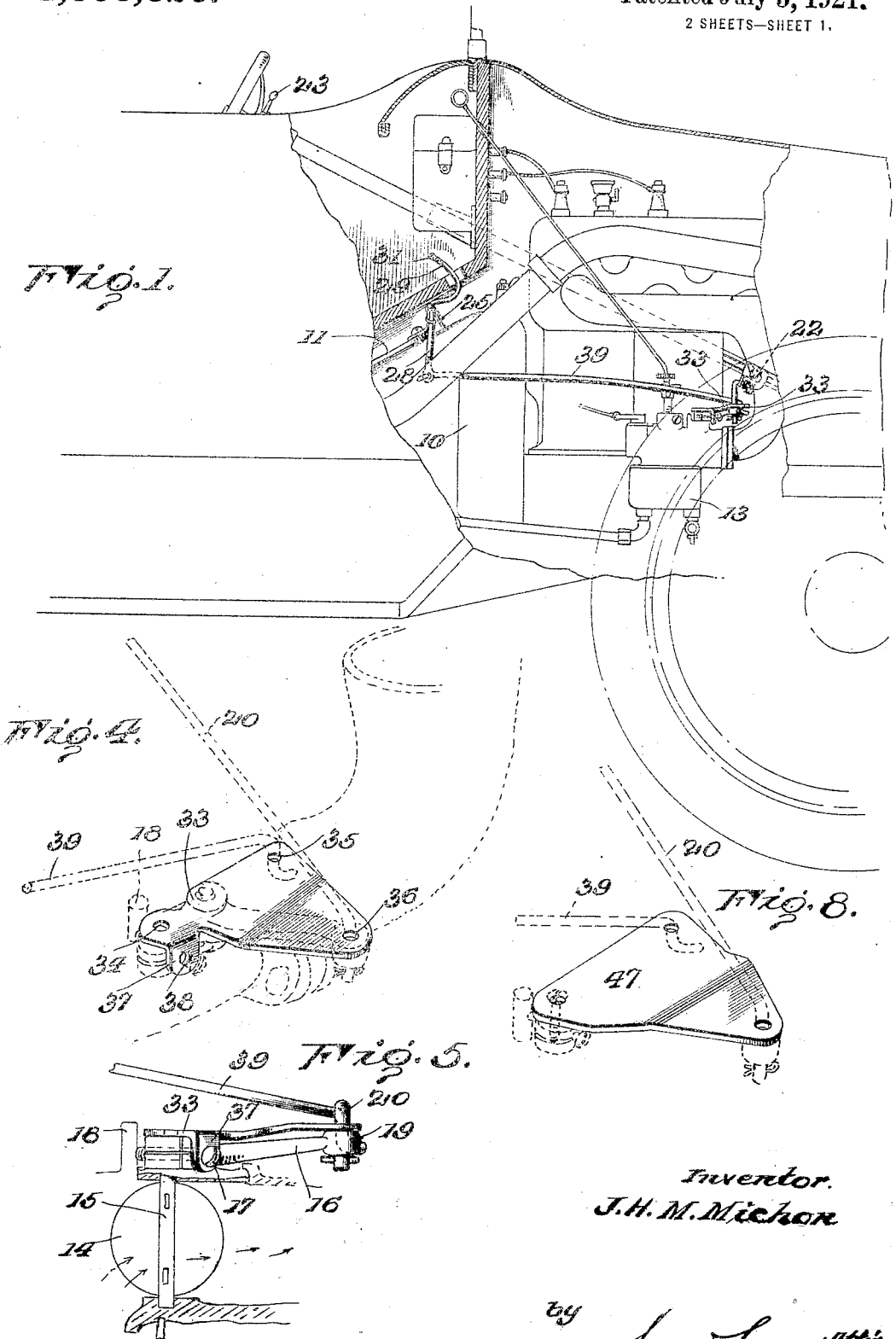

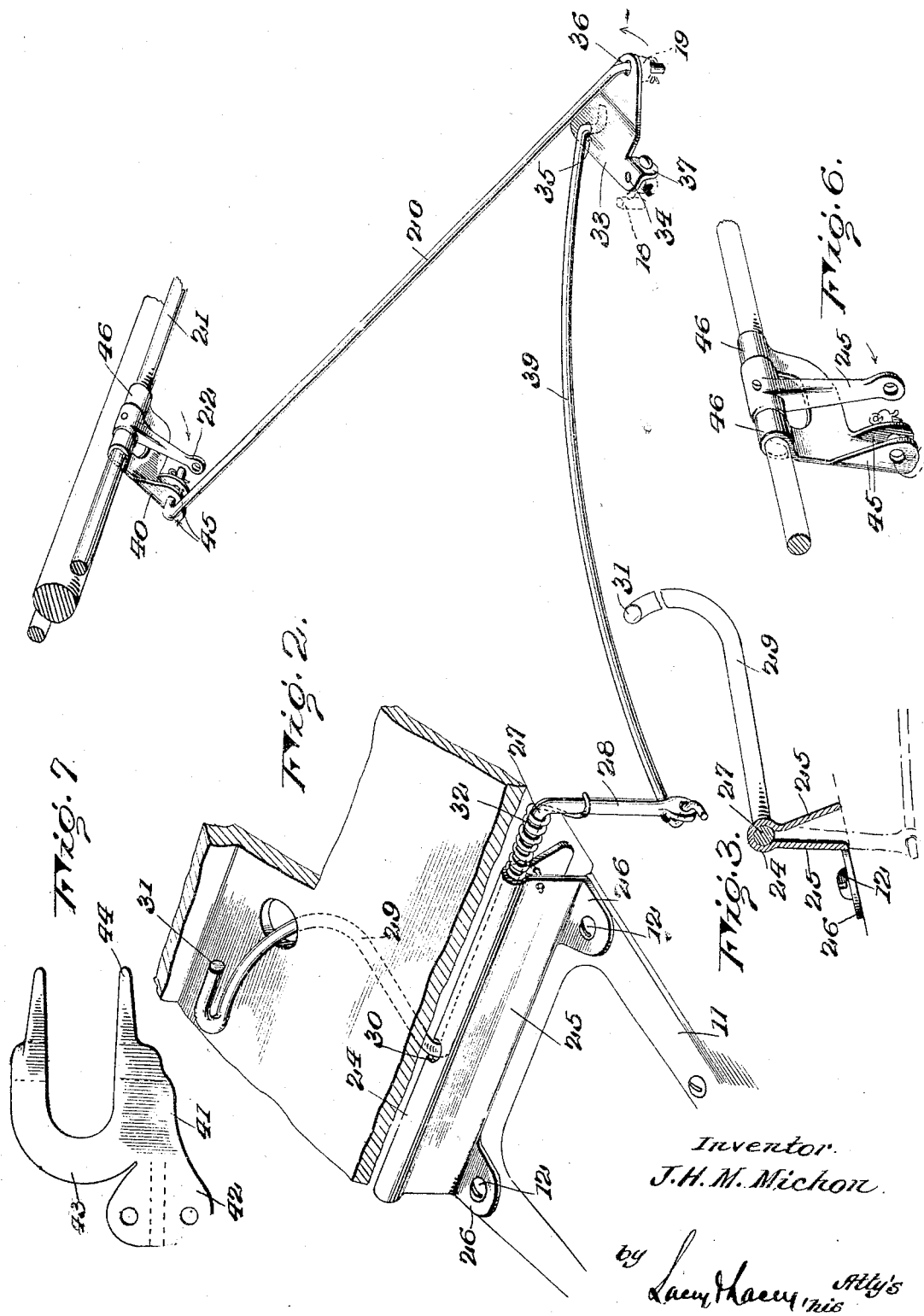

JOSEPH H. M. MICHON, OF BALTIMORE, MARYLAND.

ACCELERATOR.

1,383,326.  Specification of Letters Patent.  Patented July 5, 1921.

Application filed October 24, 1919. Serial No. 332,991.

*To all whom it may concern:*

Be it known that I, JOSEPH H. M. MICHON, citizen of the United States, residing at Baltimore, in the city of Baltimore and State of Maryland, have invented certain new and useful Improvements in Accelerators, of which the following is a specification.

This invention relates to an improved foot accelerator for motor vehicles, being particularly designed for use upon vehicles of the Ford type, and has as one of its principal objects to provide a device of this character which may, without structural change in the vehicle, be readily applied.

The invention has as a further object to provide a device which will not interfere with the movement of the throttle control lever of the vehicle so that, if desired, this lever may be manipulated in the usual manner when driving the vehicle and wherein the device will also operate independently of the throttle control lever so that movement of the accelerator will not serve to shift the lever.

And the invention has as a still further object to provide a device which will be composed of few and simple parts and which will, in actual use, prove entirely dependable.

Other and incidental objects will appear hereinafter.

In the drawings:

Figure 1 is a side elevation partly broken away and showing my improved accelerator applied to a vehicle of the Ford type, Fig. 2 is a perspective view of the device on a slightly enlarged scale, Fig. 3 is a sectional view taken through the foot lever bracket of the device, Fig. 4 is a perspective view particularly illustrating the plate employed for coupling the accelerator with the throttle valve of the vehicle carbureter, Fig. 5 is a fragmentary side elevation showing the coupling plate applied, Fig. 6 is a fragmentary perspective view showing the arm employed for coupling the throttle control rod of the vehicle with the throttle valve, Fig. 7 is a plan view illustrating the blank from which the coupling arm is formed, and Fig. 8 is a fragmentary perspective view showing a slightly modified form of coupling plate.

In order that the construction, mounting and operation of my improved accelerator may be accurately understood I have, in the drawings, shown the device in connection with a vehicle of the Ford type, the device being, as previously intimated, especially designed for use in connection with this type of vehicle. However, I do not wish to be limited in this regard since the invention will prove highly effective wherever found applicable. Referring particularly to Figs. 1 and 2, the transmission cover of the vehicle is indicated at 10 and this cover is closed by the usual removable cover plate 11 held in position by a plurality of machine screws, the screws at the upper corners of the plate being indicated at 12. At 13 is illustrated the vehicle carbureter. As is usual, this carbureter is, as shown in Fig. 5, provided with a throttle valve 14 having a stem 15 projecting up through the top wall of the carbureter and secured to said stem is a lever 16 slightly bent longitudinally. At its inner end the lever 16 carries a stop screw 17 adapted to coöperate with the stop 18 upon the carbureter for limiting the valve in its movement to closed position. At its outer end the lever is provided with an eye 19 through which is removably engaged one end of a rod 20 which ordinarily serves as a direct connection between the throttle control rod of the vehicle and the throttle valve lever. The throttle control rod is indicated at 21. Fixed to the lower end portion of this rod is an arm 22, to which the adjacent end of the rod 20 is normally connected and formed on the rod at its upper end is the usual throttle lever 23.

In carrying the invention into effect, I employ an elongated foot lever bracket. As particularly illustrated in Fig. 2, this bracket is preferably formed from a strip of suitable resilient sheet metal bent upon itself to provide a substantially cylindrical bearing or sleeve 24 from the lower side of which diverge supporting wings 25 and extending from the rearmost of said wings at its ends are laterally directed ears 26. The bracket is of a length corresponding to the width of the transmission cover plate 11 of the vehicle and, as will now be observed, is secured in position by the screws 12 for the cover plate, these screws engaging through said ears so that the rearmost of the wings 25 rests upon the cover plate at its upper end while the foremost of the wings rests directly against the transmission cover. As brought out in Fig. 1, the bracket upstands beneath but normally does not touch the front floor boards of the vehicle. However, should these front floor boards be stressed or become sagged, the bracket will then serve to reinforce said boards. Journaled in one end portion of the sleeve 24 is a shaft 27. As will be appreciated, the mouth of the sleeve is spread to receive the shaft while, owing to the resiliency of the sleeve, the shaft will be removably held therein. At one end portion, the shaft projects beyond the adjacent end of the sleeve to overhang the transmission cover of the vehicle and is provided with a depending crank 28 while from the opposite end portion of the shaft is formed a forwardly directed foot lever 29 freely received through a transverse arcuate slot 30 in the sleeve. Adjacent its free end, the lever is curved upwardly and rearwardly to freely project through a suitable slot in the front floor boards of the vehicle and, at its upper end, is formed with a laterally directed terminal 31 adapted to serve as a foot rest. Surrounding the shaft between the crank 28 and the adjacent end of the sleeve is a helical spring 32 inserted at one end portion through suitable openings in the wings 25 of the bracket to be secured thereto while the opposite end of said spring is engaged with the crank. Thus, this spring will, when the foot lever is depressed, serve to return said lever to its normal position.

In connection with the carbureter 13 I employ a coupling plate 33. As particularly shown in Figs. 2 and 4, this coupling plate is substantially triangular and is provided adjacent its corners with openings which, for convenience, have been indicated at 34, 35 and 36 respectively. Struck from the plate adjacent the opening 34 is a depending lug 37 in which is formed an opening 38. In applying the plate the stop screw 17 of the throttle valve lever 16 is first removed, when the plate is rested upon said lever in such position that the opening 38 through the lug 37 of the plate registers with the opening in the inner end of the lever which normally receives the screw. Consequently, in replacing the screw it may be engaged through the lug for rigidly connecting the plate with the inner end of the lever. Experience has shown that Ford vehicles are equipped with carbureters of slightly different type, one type being provided with a stop screw corresponding to the screw 17 and arranged in similar manner, while another type is provided with a vertical screw only, through the throttle valve lever. I have accordingly formed the plate 33 so that it may be employed in connection with either of the types mentioned, the opening 34 in the plate being adapted to receive a vertical screw to serve the same purpose as the screw 17 illustrated. The end portion of the plate provided with the opening 36 is slightly deflected upwardly to seat flat against the eye 19 of the lever and when the plate is secured by the screw 17 said opening registers with the eye so that the adjacent lateral terminal of the rod 20 may be engaged through both the plate and the eye for connecting the plate at its adjacent corner with the outer end of the lever. Consequently, as will be seen, the plate will swing with the lever about the axis of the throttle valve stem. Extending between the crank 28 of the shaft 27 and the plate 33 is a rod 39 offset at one end portion to loosely engage through a suitable opening in the free end of the crank and also offset at its opposite end portion to loosely engage through the opening 35 in the coupling plate.

Upon the throttle control rod 21 of the vehicle I employ a coupling arm 40. This arm is preferably constructed from a resilient sheet metal blank 41 of the type shown in detail in Fig. 7 of the drawings. The blank is formed with a head 42 and a yoke 43 having one arm thereof at one side of the plane of the head while upon the ends of the yoke arms are provided reduced terminal portions 44. The head is scored medially along spaced parallel lines and then bent upwardly to provide spaced ears 45 while the end portions of the yoke arms are bent to form open loops 46. These loops are adapted to freely engage about the throttle control rod 21 to be removably held thereon by the reduced terminal portions 44 of the loops. Accordingly, the coupling arm may be readily mounted upon the throttle control rod to depend therefrom in front of the arm 22, the yoke of the coupling arm being adapted to embrace the sleeve at the inner end of the latter arm so that this latter arm will thus sustain the coupling arm against longitudinal movement upon the rod. In applying the coupling arm the rod 20 is first disengaged from the arm 22 when, after the coupling arm is arranged in position the laterally directed terminal at the adjacent end of the rod is engaged through the ears 45. The device is then ready for operation.

As will now be clear in view of the preceding description, depression of the foot lever 29 will serve to swing the coupling plate 33 and accordingly swing the throttle lever 16 of the carbureter for opening the throttle valve while, when the foot lever is released, the spring 32 will immediately act to return the valve to its normal position. As the foot lever is depressed and the coupling plate 33 is swung, the coupling element 40 will move away from the arm 22 upon the throttle control rod 21. Consequently, the accelerator may be freely operated without actuating the throttle control rod and the throttle control lever 23 at the steering wheel. However, this lever may, nevertheless, be moved in the usual manner for opening the throttle valve of the carbureter. As will be at once appreciated, when the lever 23 is swung downwardly to accordingly rotate the throttle control rod 21, the arm 22 will coact with the arm 40 to in turn swing this arm for opening the throttle valve. As the lever 23 is returned to its normal position, the spring 32 will, of course, serve to again close the valve. It will accordingly be seen that I provide an accelerator which will not interfere with the use of the hand lever for manipulating the throttle valve while, if desired, the hand lever may be allowed to stand idle and the accelerator alone employed for manipulating the valve.

In Fig. 8 of the drawings I have illustrated a slightly modified form of coupling plate 47. This coupling plate is substantially identical with the coupling plate of the preferred construction with the exception that the lateral lug 37 as employed in the preferred form of plate is eliminated, the plate 47 being constructed for use alone upon carbureters of the type having a vertical screw at the inner end of the throttle valve lever thereof.

Having thus described the invention, what is claimed as new is:

1. The combination with a motor vehicle provided with a throttle control rod having an arm fixed thereto, of an accelerator including a foot lever, a connection between said lever and the throttle valve of the vehicle engine carbureter, and a connection between said valve and the throttle control rod free of the arm but held thereby against shifting in opposite directions along the rod for movement by the arm as well as movement independently thereof.

2. The combination with a motor vehicle provided with a throttle control rod having an arm fixed thereto, of an accelerator including a foot lever, a connection between said lever and the throttle valve of the vehicle engine carbureter, an arm mounted to swing upon said rod independently of the first arm but movable thereby, the fixed arm holding the swinging arm against movement in opposite directions along the rod, and a connection between the latter arm and the valve.

3. The combination with a motor vehicle provided with a throttle control rod, and means fixed to the rod to turn therewith, of an accelerator including a foot lever, a connection between said lever and the throttle valve of the vehicle engine carbureter, and a connection between the valve and the throttle control rod free of said means but held thereby against shifting in opposite directions along the rod for movement by said means as well as movement independently thereof.

4. The combination with a motor vehicle provided with a throttle control rod having a fixed arm, of an accelerator including a foot lever, a connection between said lever and the throttle valve of the vehicle engine carbureter, and a connection between said valve and the control rod including an arm having a yoke embracing the inner end of the first arm and provided with loops swingingly connecting the latter arm with the rod to depend therefrom in front of the first arm.

5. The combination with a motor vehicle provided with a throttle control rod, and means carried by the rod to turn therewith, of means swingingly mounted upon the rod free of the first means but held thereby against movement along the rod in opposite directions, a foot lever, a connection between said lever and the throttle valve lever of the engine carbureter, and a connection between the latter lever and said second mentioned means.

6. The combination with a motor vehicle provided with a throttle control rod having a fixed arm, of means mounted to swing upon the rod straddling the arm and held thereby against movement along the rod in opposite directions, said means being free to swing independently of the arm, a foot lever, a coupling plate connected to the throttle valve lever of the vehicle engine carbureter to swing therewith, a connection between the foot lever and the plate, and a connection between the plate and said means.

7. An accelerator including a foot lever, a coupling plate adapted to rest upon the throttle valve lever of a carbureter and provided at its inner end with a depending lug to overlie the inner end of the valve lever and to receive a fastening device therethrough connecting the plate to the valve lever to swing therewith, and a connection between the plate and the foot lever.

In testimony whereof I affix my signature.

JOSEPH H. M. MICHON. [L. S.]